United States Patent [19]
Doi et al.

[11] Patent Number: 4,458,526
[45] Date of Patent: Jul. 10, 1984

[54] APPARATUS FOR MEASURING TIRE UNIFORMITY

[75] Inventors: Shunichi Doi, Nagoya; Junzo Hasegawa, Obu; Mutsuo Sawa, Okazaki; Yasutaka Hayashi, Nagoya; Kazuo Miki, Aichi; Yuzo Yamamoto, Nagoya; Satoru Matsushima, Nagoya; Katsuhiko Fukui, Nagoya, all of Japan

[73] Assignee: Kabushiki Kaisha Toyota Chuo Kenkyusho, Aichi, Japan

[21] Appl. No.: 317,727

[22] Filed: Nov. 3, 1981

[30] Foreign Application Priority Data

Nov. 26, 1980 [JP] Japan .................................. 55-166130

[51] Int. Cl.³ ................................................ G01M 17/02
[52] U.S. Cl. ........................................................ 73/146
[58] Field of Search ........................................... 73/146

[56] References Cited

U.S. PATENT DOCUMENTS

| | | | |
|---|---|---|---|
| 3,060,734 | 10/1962 | Obarski et al. | 73/146 |
| 3,479,867 | 11/1969 | Tarpinian et al. | 73/146 |
| 3,552,200 | 1/1971 | Hermanns et al. | 73/146 |
| 3,661,014 | 5/1972 | Ciampolini | 73/146 |
| 3,948,095 | 4/1976 | Burgett et al. | 73/146 |
| 4,171,641 | 10/1979 | Landsness | 73/146 |

*Primary Examiner*—Donald O. Woodiel
*Attorney, Agent, or Firm*—Blum, Kaplan, Friedman, Silberman and Beran

[57] ABSTRACT

The automotive tire being measured is loaded in advance by the load applying means, and the drum is driven to rotate the tire. A displacement of the rotatable shaft produced in response to a variation in the radial force acting between the tire and the drum is detected as a displacement of the movable member which is in turn indicated as the radial force variation generated on the tire. Thus, the apparatus can measure a radial force variation with precision under a condition approximating an actual running condition of automobiles.

14 Claims, 13 Drawing Figures

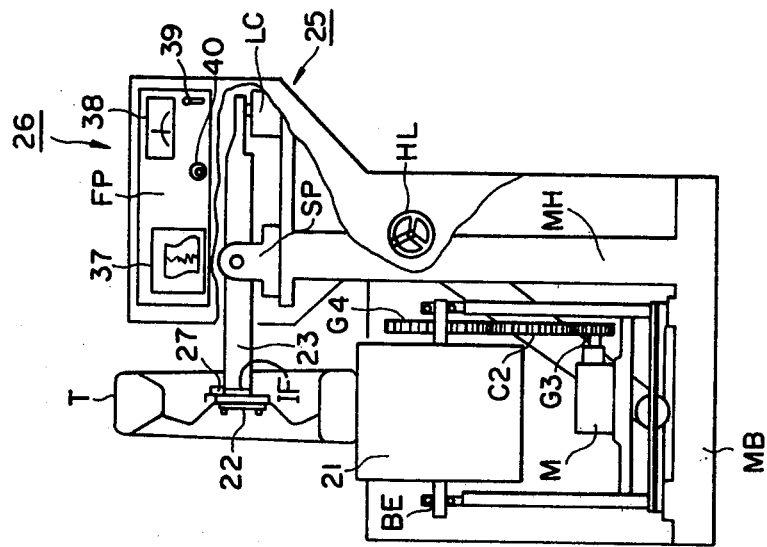

APPARATUS FOR MEASURING TIRE UNIFORMITY

BACKGROUND OF THE INVENTION

1. Field of the Invention

The present invention relates to a tire uniformity measuring apparatus for simply measuring a variation in the load exerted radially on a tire being measured.

2. Description of the Prior Art

As the network of expressways spreads and automobiles are required to be driven continuously at higher speeds for longer periods of time, many efforts have been made to improve safety, drivability and riding comfort of automobiles.

There has been a strong need for high-performance automotive tires which have a primary function to hold automobiles on road, and hence research and development of such tires find themselves active nowadays.

Noises, vibrations, and impaired drivability occasioned while a car is driven at high speeds tend to give the driver and passengers a rough ride, accelerate their fatigue, and moreover invite the risk of causing a traffic accident. One of factors which cause these undesirable phenomena is considered to be non-uniformity of tires that includes untrue or out-of-round tire shapes and irregularities in tire rigidity due to uneven thickness and hardness around the circumference of a tire. These physical irregularities arise out of the fact that tires are made of various laminated materials such as rubber, synthetic fibers, steel cords, bead wires and others.

There has been established a standard for measuring tire uniformity based on which tire manufacturers inspect all of their tires. Tires which have been found nonuniform are ground to correct radial force variations (called "R.F.V."). Uniformity of tires has also been demanded by a proposed reduction in the overall weight of cars and hence the weight of members under spring means under the current program for saving resources and energy.

Conventional tire uniformity measuring apparatus include a rotatable cylindrical drum against which a tire being measured is held at a fixed interaxial distance for measuring a variation in the radial force (R.F.V.) exerted to the shaft of the drum being revolved. With the fixed interaxial distance between the drum and the tire, the conventional apparatus are required to have an increased overall rigidity of the apparatus. The known apparatus are also disadvantageous in that the drum is driven to rotate at high speeds, say, several tens of revolutions per minute, a sophisticated electrical measurement circuit is required, and the apparatus are large in size, costly to construct, and take a prolonged period of time for measurement.

SUMMARY OF THE INVENTION

The present inventors have made the present invention through systematic experiments and theoretical analyses conducted in an attempt to develop a tire uniformity measuring apparatus which will eliminate the problems experienced with the prior apparatus.

It is an object of the present invention to provide a tire uniformity measuring apparatus for measuring a radial force variation on a tire with precision under a condition approximating an actual running condition.

Another object of the present invention is to provide a tire uniformity measuring apparatus which can be handled with ease, light in weight, compact in size, and inexpensive to construct.

An apparatus for measuring tire uniformity according to the present invention comprises a drum for rotating a tire being measured; a rotatable shaft having a member for securing the tire; a movable member disposed at a predetermined position with respect to the drum and having a portion rotatably supporting the rotatable shaft, the movable member being responsive to the force acting between the drum and the tire being measured for positionally changing the portion rotatably supporting the rotatable shaft; means for applying in advance a predetermined load to the tire being measured by changing the interaxial distance between the drum and the rotatable shaft; means for detecting a displacement of the rotatable shaft, as a displacement of the movable member, produced in response to a variation in the radial force acting between the tire being measured and the drum when the tire is rotated by the drum; and means for indicating a variation in the radial force on the tire being measured based on the displacement of the movable member, whereby a variation in the radial force imposed on the tire being measured can be measured With the tire uniformity measuring apparatus thus constructed, the automotive tire being measured is loaded in advance by the load applying means, and the drum is driven to rotate the tire. A displacement of the rotatable shaft produced in response to a variation in the radial force acting between the tire and the drum is detected as a displacement of the movable member which is in turn indicated as the radial force variation generated on the tire. Thus, the apparatus can measure a radial force variation with precision under a condition approximating an actual running condition of automobiles.

The tire uniformity measuring apparatus according to the present invention allows the rotatable shaft to which the tire being measured is attached to be displaced slightly in order to detect a reactive force from the shaft as a displacement of the movable member, rather than fixing the interaxial distance between the drum and the tire while revolving under a given load.

No measurement at the shaft being rotated is therefore made, a feature different from the conventional apparatus, and hence a force variation corresponding to a radial force variation on the tire can be picked up with utmost ease.

The tire uniformity measuring apparatus according to the present invention is additionally advantageous in that the apparatus is of less overall rigidity than prior apparatus, does not require a sophisticated electrical measurement circuit, is simple in construction, light in weight, compact in size, and inexpensive to construct.

Prior to describing apparatus according to embodiments of the present invention, the principles of the present invention for measuring a variation in the radial force exerted on a tire will first be described with reference to FIGS. 1(a) and 1(b).

FIG. 1(a) is illustrative of an equivalent lever L utilized to explain the principles for measurement according to the present invention.

Designated at A is a fulcrum, B a point where a force f acts from a tire (spring constant: K), and C a point for measurement of a displacement (force). The point B is spaced from the fulcrum A by a distance $l_1$ and the point C is spaced from the fulcrum A by a distance $l_2$. The lever L is displaced by $\delta_1$ at the point B and by $\delta_2$ at the point C. A relative load acting between the drum and the tire is equivalent to a mass m imposed on the equivalent lever L at the point C. Designated at k is a spring constant of the load imposed on the displacement measuring point C, and at $\delta_0$ is a displacement of the axes of the drum and tire under the relative load at a point B' where the drum and the tire act on each other.

It is assumed that weight of the equivalent lever and the relative load applied are respectively zero (in a state of balance).

The force which corresponds to a variation in the radial force (R.F.V.) exerted on the tire can be expressed by the following equation:

$$f = K(\delta_0 - \delta_1) \quad (1)$$

The following equations can be given when the lever is in a state of balance or the moments are in equilibrium:

$$l_1 \delta_2 = l_2 \delta_1 \quad (2)$$

$$l_1 K(\delta_0 - \delta_1) = l_2 k \delta_2 \quad (3)$$

From the above two equations, the displacement $\delta_0$ at the point B' can be given by the following equation because the lever L is displaced by $\delta_2$ at the point C:

$$\delta_0 = \frac{K l_1^2 + k l_2^2}{K l_1 l_2} \cdot \delta_2$$

Because of the lever displacement $\delta_2$ at the point C, the lever displacement $\delta_1$ at the point B can be expressed by:

$$\delta_1 = (l_1/l_2)\delta_2$$

By putting these equations into the equation (1), the force f to be measured can be given by:

$$f = k(l_2/l_1)\delta_2$$

Therefore, the force f can be obtained by seeking the displacement $\delta_2$ of the lever at the point C.

From the equations (2) and (3), the lever displacement $\delta_1$ at the point B can be expressed by the following equation:

$$\delta_1 = \frac{K l_1^2}{K l_1^2 + k l_2^2} \cdot \delta_0 = \frac{1}{1 + \left(\frac{k}{K}\right)\left(\frac{l_2}{l_1}\right)^2} \cdot \delta_0$$

Accordingly, the ratio of $\delta_1$ to $\delta_0$ is as follows:

$$\frac{\delta_1}{\delta_0} = \frac{1}{1 + \left(\frac{k}{K}\right)\left(\frac{l_2}{l_1}\right)^2}$$

FIG. 1(b) shows a curve plotted according to the above equation. By selecting the spring constant k at the point C so as to be sufficiently larger than the spring constant K of the tire (K << k), the lever displacement $\delta_1$ at the point B approaches zero infinitely, thus allowing a substantially accurate radial force (hereinafter called "R.F.V.") to be obtained.

A measurement obtained on an apparatus according to the present invention will be described with reference to FIGS. 2(a) and 2(b).

FIG. 2(a) illustrates for comparison an R.F.V. waveform generated on an apparatus of the present invention and an R.F.V. waveform on a conventional apparatus. FIG. 2(b) shows correlated peak-peak values of R.F.V. waveforms obtained on both of the apparatus.

From the comparison, it has been found that the waveforms are in substantial conformity with each other and their peak-peak values exhibit a correlation of 0.951. Primary, secondary, third and fourth fundamental harmonics of both measured data exhibit correlations of 0.817, 0.918, 0.976, 0.900, respectively. The apparatus of the present invention has proven capable of giving sufficient values for determining tire uniformity.

The present invention can be put into practice in the following aspects.

According to a first aspect, the movable member comprises a pivot arm having one end pivotally supported and including at a suitable position thereof the supporting portion supporting the rotatable shaft for rotation with the tire being measured, whereby the arm is pivotally movable in response to a variation in the force imposed radially on the tire.

With the first aspect, a predetermined load is imposed in advance on the tire being measured by changing the position of engagement of the other end of the movable member with the load applying means and the load applied, so that a variation in the force imposed radially on the tire can be detected by a displacement of the other end of the movable member.

According to a second aspect, the movable member comprises a cantilever having one end rigidly secured to a frame and including at the other end the supporting portion supporting the rotatable shaft for rotation with the tire being measured, and also comprises at a suitable position thereof a stress-concentrative member which is mostly deformable when the cantilever is bent in response to a variation in the force imposed radially on the tire.

With the second aspect, a variation in the force imposed radially on the tire can be detected by a strain produced in the stress-concentrative portion of the cantilever.

According to a third aspect, the movable member comprises a movable arm pivotally supported at its center and having on one end thereof the supporting portion supporting the rotatable shaft for rotation with the tire being measured, whereby the other end of the arm is pivotally movable in a direction opposite to the direction of pivotal movement of said one end in response to a variation in the force imposed radially on the tire.

With the third aspect, a load responsive to a displacement of the other end of the pivotally movable member can be detected by a load cell to determine a variation in the force imposed radially on the tire.

The tire uniformity measuring apparatus according to the present invention can detect a displacement of the movable member as a mechanical displacement, an electrical displacement, or other physical displacements.

BRIEF DESCRIPTION OF THE DRAWINGS

Various other objects, features and advantages of the present invention will be apparent from the following detailed description when considered in connection with the accompanying drawings, in which like reference characters designate like or corresponding parts throughout the several views, and wherein:

FIG. 7 through 9 illustrate an apparatus according to a third embodiment, FIG. 7 being a side elevational view of the apparatus, FIG. 8 being a front elevational view of the apparatus, FIG. 9 being a circuit diagram of an electric circuit in the apparatus.

DESCRIPTION OF THE PREFERRED EMBODIMENTS

The present invention will be described in detail with reference to embodiments thereof.

Figure 3:
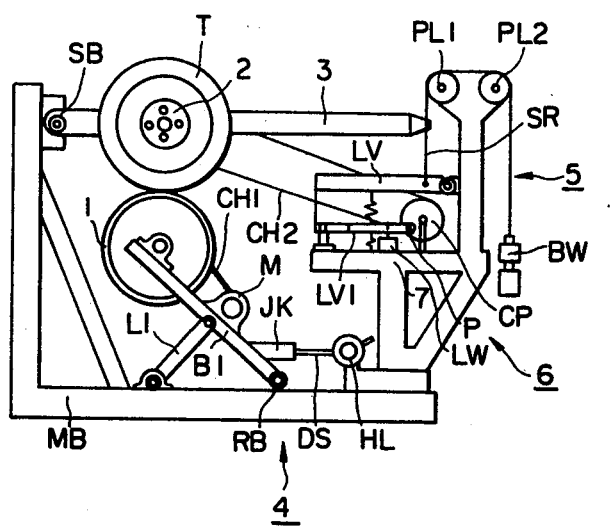
FIG. 3 is a front elevational view of an apparatus according to a first embodiment.

A tire uniformity measuring apparatus according to a first embodiment (the first aspect) will now be described with reference to FIG. 3.

The apparatus according to the first embodiment has no electrical measuring circuit, but converts a detected load mechanically into a displacement of a lever for measuring tire uniformity without consuming excess electrical power.

The tire uniformity measuring apparatus comprises a drum 1 driven to rotate by an electric motor M through a chain CH1, a tire holder 2 serving as a rotatable shaft for holding a tire T to be measured, a movable member 3 comprising a movable arm having one end pivotally supported, a load applying means 4 comprising a table B1 mounting thereon the drum 1 and the motor M, a link L1, a jack JK, and a handle HL, a displacement detecting means 5 comprising a steel ribbon SR, two pulleys PL1, PL2, a counterbalance BW, and lever LV, and an indicator means 6 comprising a lever LV1, a circular chart plate CP, a chain CH2, a load weight LW, and a pen P.

All of the components of the apparatus are mounted on an L-shaped machine base or frame MB. The movable member 3 comprises a lever having the tire holder 2 serving as a supporting portion rotatably supporting the tire T being measured, and is pivotally supported at one end on an upper portion of the frame MB. The levers LV, LV1 are pivotally mounted on a table 7 disposed on the frame MB for ganged movement by the steel ribbon SR held in engagement with the lever 3.

The tire holder 2 is positioned at a point where the leverage is 1:0.25. The lever LV is pivotally supported at a point where the leverage is 1:10, and the lever LV1 is pivotally supported at a point where the leverage is 1:10, the lever LV1 engaging the load weight LW at a free end portion thereof.

The pen P is attached to a free end of the lever LV1 and is movable upwardly and downwardly as the lever LV1 moves through an amount of displacement which corresponds to a variation in the force applied to the tire T. The chart plate CP is mounted by a bearing on the table 7 and receives a circular sheet of chart paper fitted therein. The chart plate CP is coupled by the chain CH2 to the tire holder 2 for corotation such that when the tire holder 2 makes one revolution, the chart plate CP also makes one revolution. As the tire T makes one revolution, the circular sheet of chart paper records thereon a movement of the pen P which is indicative in an arcuate curve of a variation in the force applied to the tire T.

The load applying means 4 for imposing a relative load on the tire and the drum will next be described.

The link L1 has one end pivotally supported on the MB frame and is pivotally supported at the other end on the table B1 at a substantially central position thereof. The motor M is installed substantially centrally on the table B1. The table B1 has on one end thereof a roller bearing which can roll smoothly on an upper surface of the frame MB. The table B1 has on the other end the drum 1 rotatably supported thereon so that a line extending through the axes of the drum 1 and tire T extends vertically to the upper surface of the frame MB. The drum 1 is driven by the motor M through the chain CH1 to revolve at a predetermined RPM. The table B1 is movable rightwardly or leftwardly by manually rotating the handle HL to rotate a drive screw DS for the jack JK, causing the drum 1 to move upwardly or downwardly. Thus, the drum 1 can be pressed against the tire T vertically rectilinearly to impose a desired relative load on the tire T.

When the tire T is driven to rotate by the drum 1, a variation in the force applied to the tire T is recorded on the circular sheet of chart paper. The circumferential positions on the tire T correspond to the circumferential positions on the circular sheet of chart paper. Accordingly, a variation in the force imposed on the tire can be displayed as it is on the chart paper for clearly showing irregularities on the tire T.

The apparatus according to the present invention converts detected loads on the tire mechanically into displacements of the lever without consuming electric power, and hence is durable in structure and inexpensive to construct.

Figure 1A:
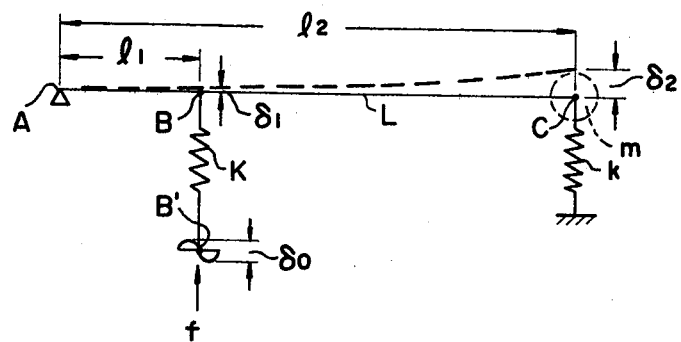
FIG. 1(a) and (b) are a view illustrative of the principles of measurement according to the present invention and a graph showing a relationship of displacement, respectively.
Figure 1B:
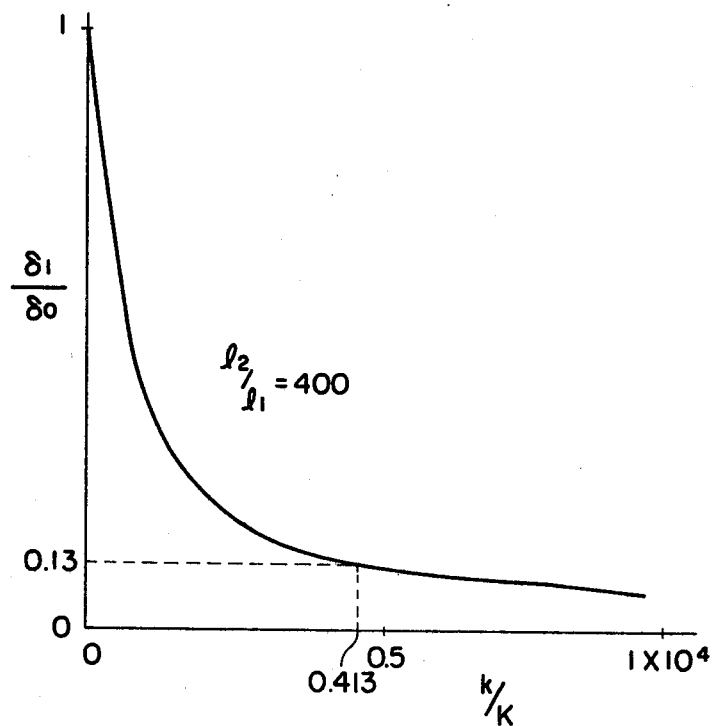
Figure 2A:
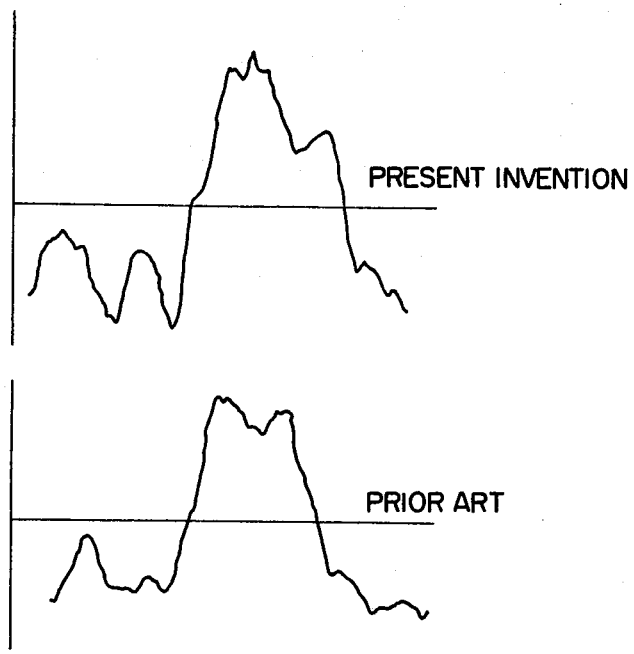
FIG. 2(a) is a graph showing measurements for comparison.
Figure 2B:
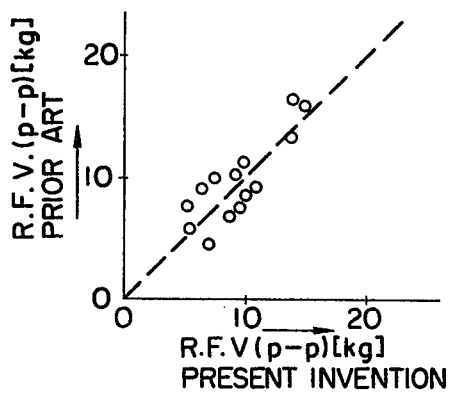
FIG. 2(b) is a graph showing a relationship of correlation between an apparatus of the present invention and a conventional apparatus.

With the apparatus in accordance with the first embodiment, the spring constant K of the tire is 22 Kg/mm and the spring constant k at the load measuring point is 0.0009 Kg/mm to give $\delta_1/\delta_0=0.13$ as indicated by the broken line in FIG. 1(b). The lever is allowed to be displaced by 13% of the displacement of the tire for obtaining R.F.V. values.

An apparatus according to a second embodiment (the second aspect) of the present invention will be described with reference to FIGS. 4 through 6.

While the conventional apparatus have detected a reactive force from the support shaft of the tire or the drum, the tire uniformity measuring apparatus according to the second embodiment comprises a movable member 13 having one end rigidly supported for supporting on the other end a tire T rotatably for movement only in a plane constituted jointly by the shafts of the tire and drum, the movable member 13 thus comprising a cantilever serving as a reactive force detector rod.

Adjacent to the fixed end of the reactive force detector rod, there is located a load detecting strain gage serving as a displacement detector means 15 for measuring a reactive force against the tire shaft based on a bending strain produced while the tire shaft is allowed to be displaced slightly.

The reactive force against the tire shaft is properly indicative of an R.F.V. (a variation in the force applied radially to the tire) which constitutes an optimum factor for assessing tire uniformity. Values of the reactive force are measured and recorded to determine nonuniformity of the tire.

The measuring apparatus according to the second embodiment will be described in detail for its construction, operation and advantages.

Figure 4:
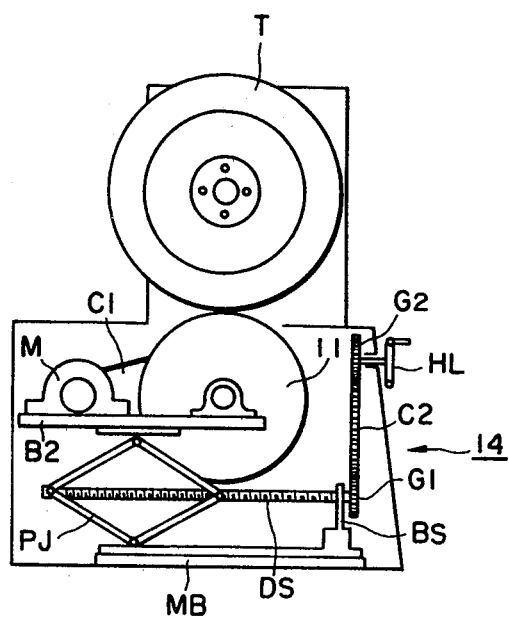
FIG. 4 through 6 show an apparatus according to a second embodiment, FIG. 4 being a side elevational view of the apparatus, FIG. 5 being a front elevational view of the apparatus, FIG. 6 being a block diagram of an electric circuit in the apparatus.

As shown in FIG. 4, a load applying means 14 for imposing a relative load on a tire and a drum comprises a table B2 mounted on a pair of pantograph-shaped jacks PJK supported on a machine base or frame MB. An electric motor M and a rotatable drum 11 drivable thereby through a chain C1 are mounted on the table B2. A tire T is disposed such that its axis is vertically aligned with the axis of the rotatable drum 11. The pantograph-shaped jack PJK has a drive screw DS which extends through a bearing BS and which has a gear G1 rotatable by a chain C2 which extends around a gear G2 connected to a handle HL rotatably supported on a support post MH and disposed exteriorly of the frame. Thus, the jacks PJK are driven by rotation of the handle HL to move the drum 11 vertically to impose a predetermined load on the tire T being measured.

The displacement detector means 15 comprises strain gages SG attached to a stress-concentrative portion adjacent to the fixed end of a cantilever beam 17 which constitutes the movable member 13 having on one end a tire holder 12 for supporting the tire T. The tire T is attached to the tire holder 12 for free rotation. A prior art bearing mechanism as is conventionally used in the shaft of the front wheel of a rear wheel drive automobile is provided at the axial end portion of the first movable member and rotatably supports the rotatable shaft of the tire. The interface between the rotating holder 12 and the non-rotating support 17 in FIG. 5 is identified as IF. The beam 17 has the other end rigidly fixed to the support post MH. The strain gages SG are attached to opposite sides of a vertically constricted portion of the beam 17 located adjacent to the fixed end thereof, the beam 17 being bendable in a plane defined jointly by the shafts of the drum and tire. When the beam 17 is bent under a force applied radially to the tire T mounted on the distal end of the beam 17, the strain gages SG detect the bending stress produced in the beam 17 as a bending strain to derive a bending force or load. The constricted portion of the beam 17 should be flexible enough to allow a load acting on the distal end thereof to be detected and also should be of a sufficient mechanical strength.

With the foregoing arrangement, the tire T is given a load corresponding to an actual load which the tire T would be subjected to when running on a road by manually moving the drum 11 vertically through the handle HL, and at the same time reactive forces applied against the shaft of the tire while the latter is rotated by the drum 11 can be detected by the strain gages SG as bending forces imposed on the beam 17.

Figure 5:
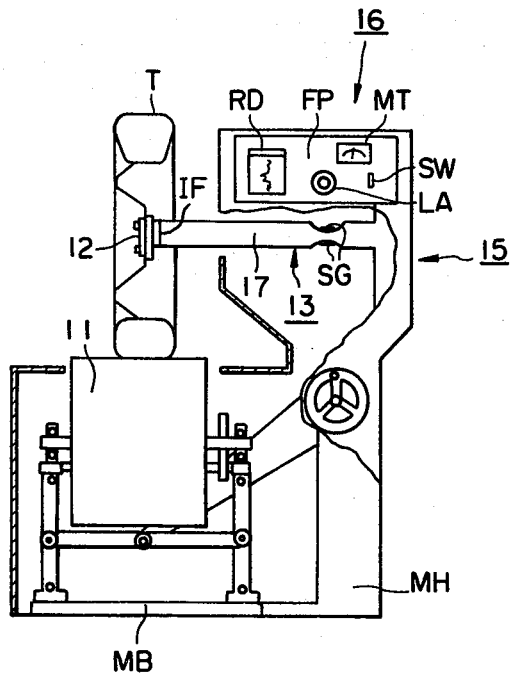

An indicator means 16, as shown in FIG. 5, is housed in an electric circuit container box mounted on the support post MH at an upper portion thereof which is sufficiently rigid. The container box has a front panel FP on which are mounted a load variation recorder RD, a load indication meter MT, a switch SW, and a level adjustment dial LA.

Figure 6:
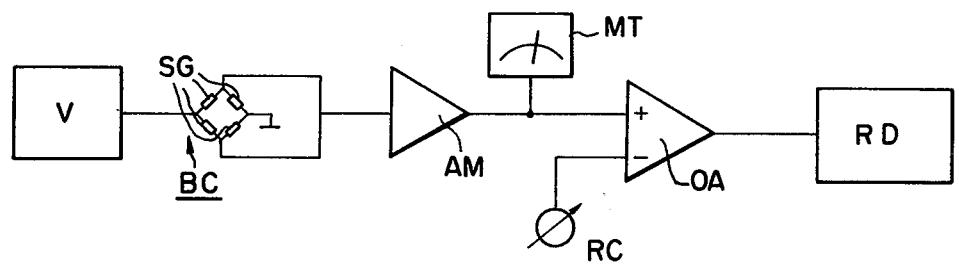

The indicator means 16 comprises an electric circuit as illustrated in FIG. 6. A bridge circuit BC of the strain gages SG wired in full bridge form is energized by a voltage applied by a power supply V to generate a signal which is amplified by an amplifier AM. An amplified signal is indicated on the load indication meter MT, which is graduated in units of Kg. The operator can establish a desired load imposed on the tire while observing indications on the meter MT. The amplified signal is supplied to an arithmetic circuit OA wherein the signal is added to a signal generated by a load setting circuit RC. Arithmetic operation is performed to substract a signal to be indicated on the meter MT, thereby obtaining only a singal being indicative of a variation in the load applied to the tire T while being revolved. The signal thus obtained is supplied to the load variation recorder RD in which load variations are recorded on recording paper.

Thus, an R.F.V. waveform can be displayed on the recorder RD. With electric detection of load variations, the apparatus according to the second embodiment is compact in size and practically advantageous.

A tire uniformity measuring apparatus according to a third embodiment (the third aspect) will be described with reference to FIGS. 7 through 9.

The tire uniformity measuring apparatus of the third embodiment comprises a movable member 23 serving as a balance rod pivotally supported centrally on a machine base or frame and movable only in a plane defined jointly by the axes of a tire T and a drum, the tire T being mounted on one end of the movable member 23, and a load cell located at the other end of the movable member 23, so that the load cell can measure reactive forces applied against the shaft of the tire while the latter is allowed to move slightly. The reactive force against the tire shaft is properly indicative of an R.F.V. (a variation in the force applied radially to the tire) which is an optimum factor for assessing tire uniformity. Values of the reactive force are measured and recorded to determine non-uniformity of the tire.

The measuring apparatus according to the third embodiment will be described in detail for its construction, operation and advantages.

A load applying means 24 comprises, as illustrated in FIG. 7, a reversed L-shaped support BL having plates SL1, SL2 and a rigid table B3 sliding on the plates SL1, SL2. The table B3, as shown in FIG. 8, has on one end thereof a drum shaft journalled in a bearing BE, the drum shaft having on opposite ends thereof bearings TB1 rolling on the plates SL1. A motor M is mounted on the table B3 for driving a drum 21 having a diameter of 300 mm through a chain C2 disposed around a motor gear G3 and a driven drum gear G4. The gear ratio between the gears and RPM of the motor M are selected such that the tire T will be driven to rotate at a speed of 5 revolutions per minute. The table B3 has on the other end a pair of bearings TB2 movable on the plates SL2. A jack JK is connected to the lower end of the table B2 at its center and is actuatable by a drive screw DS extending through a bearing on the frame MB to move the lower end of the table B3 back and forth. The jack JK is actuatable by rotation of the handle HL journalled on a support post MH and disposed exteriorly of the frame through a chain C3 extending around gears G5, G6. The load applying means 24 thus constructed moves the drum 21 upwardly or downwardly.

A displacement detector means 25 comprises a load cell LC for detecting displacements of the balance lever 23 supporting the tire T as load variations.

The tire T being measured is freely rotatably mounted on a tire holder 22 on one end of the balance lever 23 with the other end thereof being free. The interface between the rotating holder 22 and non-rotating lever 23 (FIG. 8) is identified as IF. A switch 27 for generating primary pulses upon rotation of the tire T is disposed adjacent to the tire holder 22. The balance lever 23 is centrally pivotally supported by a bearing SP fixed to the support post MH. The free end of the balance lever 23 is flat and held against a top end of the load cell LC disposed on the support post MH at an upper portion thereof. The axes of the tire and drum are in vertical alignment with each other.

By manually moving the drum 21 vertically with the handle HL, the tire T being measured is given a load corresponding to an actual load which the tire T would undergo while running on a road. The load cell LC can detect reactive forces produced against the shaft of the tire T as the latter is driven to rotate by the drum 21 driven by the motor M.

As illustrated in FIG. 8, an indicator means 26 is housed in an electric circuit container mounted on the support post MH at an upper portion thereof which is sufficiently rigid. The container box has a front panel FP mounting thereon a recorder 37, a meter 38, a switch 39, and a level adjustment dial 40.

Figure 9:
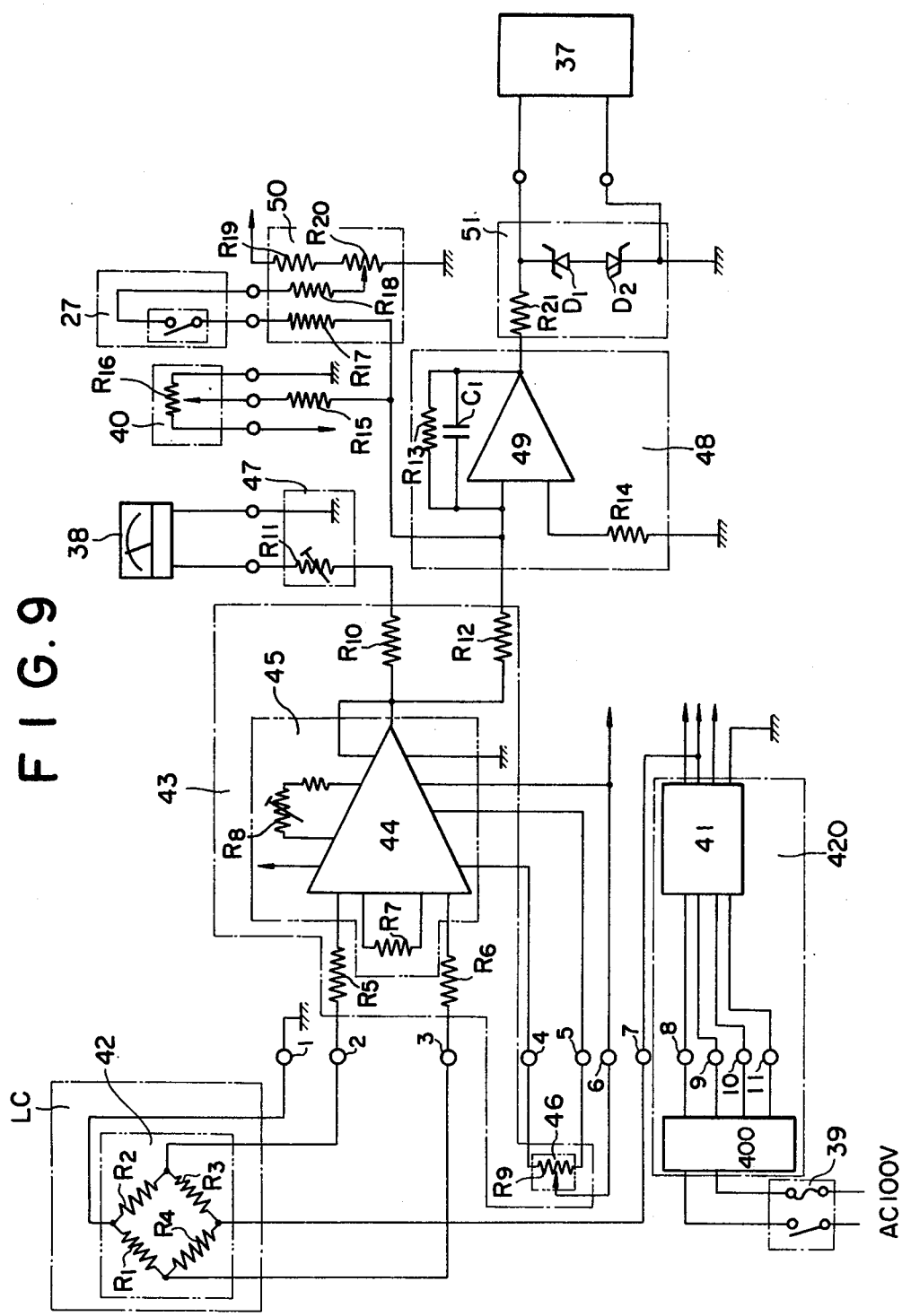

The indicator means 26 comprises an electric circuit as shown in FIG. 9. The circuit includes a power supply comprising the switch 39 and a voltage generating circuit 42 having a transformer 400 and a voltage regulator 41. The circuit is supplied with inputs which comprise an output from a bridge circuit 42 having strain gages $R_1$–$R_4$ connected in full bridge form on stress rods in the load cell LC, and an output from the primary pulse generation switch 27. The electrical circuit shown in FIG. 9 except the bridge circuit 42 and the primary pulse generation switch 27 is accomodated in the container box.

The output from the bridge circuit 42 in the load cell LC is supplied via terminals 2, 3, protective resistors $R_5$, $R_6$ to signal amplifier 44 in a signal amplifying circuit 43. The signal amplifying circuit 43 comprises the signal amplifier 44, a gain adjuster 45 including resistors $R_7$, $R_8$, and a zero adjuster 46 having a variable resistor $R_9$. The amplified signals from the signal amplifier 44 are supplied to the meter sensitivity setting circuit 47 and to circuit 48. An amplified signal from the signal amplifier 44 is supplied via a protective resistor $R_{10}$ and a meter sensitivity setting circuit 47 comprising a variable resistor $R_{11}$ to the indication meter 38.

The indication meter 38 is graduated in Kg for indicating the magnitude of a signal as calibrated by the zero adjuster 46 and the gain adjuster 45 in the signal amplifying circuit 43. The operator, while observing the indication on the meter, can move the drum 21 upwardly with the handle HL to impose on the tire T being measured a load corresponding to an actual load which would act on the tire T while running on a road.

The amplified signal from the signal amplifier 44 is also supplied via a protective resistor $R_{12}$ to a circuit 48 for separating a signal component for load variations which comprises a protective resistor $R_{13}$, a protective capacitor $C_1$, an adder 49, and a protective resistor $R_{14}$. The adder 49 is supplied with a signal from a level adjustment dial 40 comprising a variable resistor $R_{16}$ via a resistor $R_{15}$ and also supplied with a signal from the primary pulse generation switch 27 via a gain adjuster 50 comprising resistors $R_{17}$ through $R_{20}$. The level adjustment dial 40 separates a load signal generated by the bridge circuit 42 into a signal component for a load variation produced when the tire rotates and a signal component for the initially applied load by subtracting a voltage indicative of the initially applied load from a signal voltage from the signal amplifier 44 in the signal amplifying circuit 43 to generate a signal voltage indicative of the load variation.

The primary pulse generation switch 27 comprises a leaf spring for mechanically detecting one revolution of the tire T. A pulse produced when the switch 27 is closed and opened is determined in magnitude by the gain adjuster 50 and added to the main signal in the adder 49. A signal from the adder 49 is fed through a meter protecting circuit 51 comprising a resistor $R_{21}$ and diodes $D_1$, $D_2$ to drive the recorder 37.

Thus, a load or force imposed radially on the tire T while revolving is measured by the load cell LC, which produces an output signal supplied to the signal amplifying circuit 43 and the separation circuit 48, which generates a signal indicative only of an R.F.V. (a load variation applied radially to the tire) written by a pen on a sheet of chart paper in the recorder 37. Since the waveform recorded on the chart paper includes one pulsed signal added to the substantive signal per revolution of the tire, it can be ascertained what part of the tire has the greatest R.F.V.

The apparatus according to the third embodiment is advantageous in that it can measure variations in the force imposed radially on the tire stably with precision in a condition approximating an actual running condition.

The apparatus can be handled and maintained with ease, is small in size as it takes up a small space with the drum and the tire arranged vertically relatively to each other, and is light in weight and inexpensive to construct.

The apparatus is also advantageous in that the movable member comprises a balance lever and the displacement detector means comprises a load cell used in combination with the balance lever for making stabler measurement than the second embodiment.

With the apparatus according to the third embodiment, the tire is rotated at a speed of 5 revolutions per minute which is much smaller than the speed of rotation of tires in conventional apparatus, and hence no provision is necessary to increase the rigidity of the apparatus. The drum is 300 mm in diameter, rendering the apparatus small in size and light in weight.

A tire uniformity measuring apparatus according to a fourth embodiment (the third aspect) will be described with reference to FIGS. 10 and 11, the apparatus constituting a mocification of the apparatus of the third embodiment.

While the tire and the drum are arranged in vertical alignment with respect to each other according to the third embodiment, they are aligned horizontally with respect to each other according to the fourth embodiment in order to place the tire being tested in a lowered position for easier operation of the apparatus.

The measuring apparatus of the fourth embodiment will be described for its construction, operation and advantages.

Figure 10:
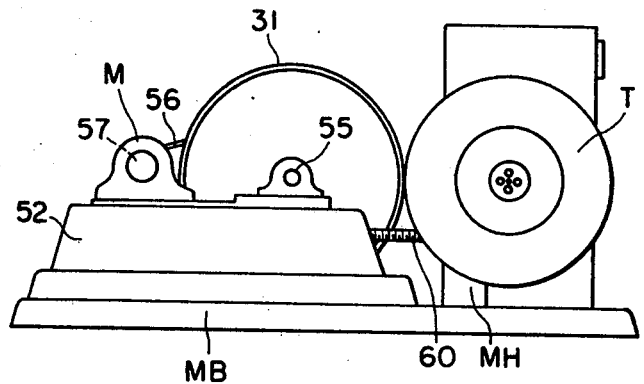
FIG. 10 and 11 show an apparatus according to a fourth embodiment, FIG. 10 being a side elevational view of the apparatus, FIG. 11 being a front elevational view of the apparatus.

A load applying means 34 comprises, as shown in FIG. 10, a slide surface 53 on a machine base or frame MB for allowing a slide frame 52 of a U-shaped cross section to slide smoothly thereon, and a guide 54 secured to the frame MB for guiding the slide frame 52 to slide in a fixed direction. A drum 31 is mounted on the slide frame 52 so as to be movable horizontally into pressed engagement with the tire T.

Figure 11:
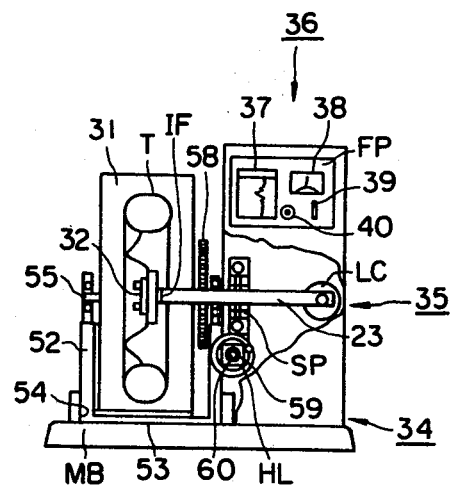

As shown in FIG. 11, the slide frame 52 which is rigid supports at a front end thereof a drum shaft 55 through a bearing and at a rear end thereof a motor M. The drum 31 is driven by the motor M through a chain 56 travelling around drive and driven gears 57, 58. The slide frame 52 has on a side wall thereof a female screw 59 through which threadedly extends a drive screw 60. By turning a manual handle HL attached to the drive screw 60 extending through a support post MH secured to the frame MB, the slide frame 52 is moved back and forth along the slide surface 53 and the guide 54.

The load applying means 34 thus constructed moves the drum 31 back and forth.

A displacement detector means 35 comprises, as in the third embodiment, a load cell LC for detecting a load variation a displacement of a balance lever 23 for holding a tire T.

As the drum 31 is disposed in horizontally confronting relation to the tire T being measured, the balance lever serving as a movable member is differently positioned and hence the load cell LC is disposed horizontally with respect to the support post MH. Other structural details are the same as those of the foregoing embodiment, and will not be described. The interface between the rotating holder 32 and the non-rotating lever 23 (FIG. 11) is identified as IF.

An indicator means 36 is of the same construction as that of the third embodiment, and hence will not be described.

When the drum 31 is manually moved horizontally with the handle HL, the tire T being measured is given a load corresponding to an actual load to which the tire T would be subjected while running on a road. The load cell LC detects reactive forces acting against the tire shaft when the tire is caused to rotate by the drum 31 driven by the motor M.

The indicator means 36 is responsive to signals detected by the load cell LC for recording variations in the force imposed radially on the tire in a recorder 37 wherein the variations are plotted by a pen on a sheet of chart paper.

The apparatus according to the fourth embodiment has the same advantages as those of the apparatus of the third embodiment and additionally can be operated with ease as the tire and the drum confront each other horizontally.

It should be understood that the present invention should not be limited to the above embodiments, and many changes in design and added modifications may be made without departing from the spirit of the appended claims.

What is claimed as new and desired to be secured by Letters Patent of the United States is:

1. A tire uniformity measuring apparatus for measuring tire uniformity comprising:
    a drum for pressing against and rotating a tire being measured;
    a rotatable shaft having a member for securing said tire, said drum and said tire secured to said rotatable shaft rotating about axes lying in a common fixed plane;
    a first movable member having a portion rotatably supporting said rotatable shaft securing said tire, said first movable member being disposed in parallel with the rotation axis of said drum and being responsive to the force acting between said drum and said tire being measured, in response to said force said portion rotatably supporting said rotatable shaft changing position, the tire rotating axis moving in said fixed plane including said tire and drum rotating axes;
    load applying means for applying in advance of rotation of said tire a predetermined load to said tire being measured by changing the interaxial distance between said drum and said rotatable shaft;
    detecting means for detecting a displacement of said first movable member corresponding to a displacement of said rotatable shaft, said displacement being produced in response to a variation in the radial force acting between said tire being measured and said drum when said tire is rotated by said drum; and
    means for indicating a variation in the radial force on said tire being measured based on the displacement of said first movable member, whereby a variation in the radial force imposed on the tire can be measured.

2. A tire uniformity measuring apparatus according to claim 1, wherein said first movable member comprises a pivot arm having one end pivotably supported and including at a suitable position thereof said supporting portion supporting said rotatable shaft for rotation with the tire being measured, said arm being angularly movable in response to a variation in the force imposed radially on the tire.

3. A tire uniformity measuring apparatus according to claim 1, wherein said first movable member comprises a cantilever having one end rigidly secured to a frame and including at the other end said supporting portion supporting said rotatable shaft for rotation with the tire being measured, and also comprising at a suitable position a stress-concentrative member which is mostly deformable when said cantilever is bent in response to a variation in the force imposed radially on the tire.

4. A tire uniformity measuring apparatus according to claim 3, wherein said detecting means comprises a strain gauge attached on a suitable position concentratively stressed.

5. A tire uniformity measuring apparatus according to claim 1, wherein said first movable member comprises a pivot arm pivotably supported at its center and having on one end thereof said supporting portion supporting said rotatable shaft for rotation with the tire being measured, the other end of said arm being angularly movable in a direction opposite to the direction of angular movement of said one end in response to a variation in the force imposed radially on the tire.

6. A tire uniformity measuring apparatus according to claim 5, wherein said detecting means comprises a load cell, for detecting the load, provided at a position opposed to the other end of said pivot arm.

7. A tire uniformity measuring apparatus according to claim 1, wherein said load applying means moves said drum in order to apply the predetermined load to the tire.

8. A tire uniformity measuring apparatus according to claim 7, wherein said drum is provided under the tire, in order to mount the tire on said drum.

9. A tire uniformity measuring apparatus according to claim 8, wherein said drum rotatably mounts on a second movable member of said load applying means.

10. A tire uniformity measuring apparatus according to claim 9, wherein said second movable member comprises a swing member pivotably supported at one end thereof in order to change the position thereof in the vertical direction in response to the angle of said swing member.

11. A tire uniformity measuring apparatus according to claim 9, wherein said second movable member comprises a plate member rotatably supporting said drum, and jack means for changing the position of said plate member in the vertical direction, fixed to said plate member at one end thereof.

12. A tire uniformity measuring apparatus according to claim 9, wherein said second movable member comprises a table having two bearings at both ends thereof, and a frame having horizontal guide rail and perpendicular guide rail on which said bearings of said table roll.

13. A tire uniformity measuring apparatus according to claim 7, wherein said drum is provided laterally to the tire.

14. A tire uniformity measuring apparatus for measuring tire uniformity comprising:

a drum for pressing against and rotating a tire being measured;

a rotatable shaft having a member for securing said tire;

a movable member having a portion rotatably supporting said rotatable shaft and securing said tire, said movable member being responsive to the force acting between said drum and said tire being measured, in response to said force, said portion rotatably supporting said rotatable shaft changing position;

load applying means for applying in advance of rotation of said tire a predetermined load to said tire being measured by changing the interaxial distance between said drum and said rotatable shaft;

detecting means for detecting a displacement of said movable member corresponding to a displacement of said rotatable shaft, said displacement being produced in response to a variation in the radial force acting between said tire being measured and said drum when said tire is rotated by said drum, said detecting means comprising a steel ribbon connected to said movable member at one end thereof, two pulleys for guiding said steel ribbon, a counterbalance fitted to the other end of said ribbon, a first pivotable lever connected to said steel ribbon, and an indicating means comprising a second pivotable lever connected to said first pivotable lever, a circular chart plate synchronously driven to the rotation of the tire by a chain, a load weight fitted to a predetermined portion of said second pivotable lever, and a pen fitted to one end of said second pivotable lever and recording on said circular chart plate; and means for indicating a variation in the radial force on said tire being measured based on the displacement of said movable member, whereby a variation in the radial force imposed on the tire can be measured.

* * * * *